US011627206B2

(12) United States Patent
Fleck

(10) Patent No.: US 11,627,206 B2
(45) Date of Patent: Apr. 11, 2023

(54) SYSTEM AND METHODS FOR PROVIDING USER ANALYTICS AND PERFORMANCE FEEDBACK FOR WEB APPLICATIONS

(71) Applicant: CITRIX SYSTEMS, INC., Fort Lauderdale, FL (US)

(72) Inventor: Christopher M. Fleck, Fort Lauderdale, FL (US)

(*) Notice: Subject to any disclaimer, the term of this patent is extended or adjusted under 35 U.S.C. 154(b) by 0 days.

(21) Appl. No.: 17/342,999

(22) Filed: Jun. 9, 2021

(65) Prior Publication Data
US 2021/0297505 A1 Sep. 23, 2021

Related U.S. Application Data

(63) Continuation of application No. 16/550,480, filed on Aug. 26, 2019, now Pat. No. 11,038,988.

(51) Int. Cl.
*H04L 67/75* (2022.01)
*G06F 3/0482* (2013.01)
*H04L 43/045* (2022.01)
*H04L 43/08* (2022.01)
*H04L 67/02* (2022.01)
*H04L 67/025* (2022.01)

(52) U.S. Cl.
CPC ............ *H04L 67/75* (2022.05); *G06F 3/0482* (2013.01); *H04L 43/045* (2013.01); *H04L 43/08* (2013.01); *H04L 67/02* (2013.01); *H04L 67/025* (2013.01)

(58) Field of Classification Search
None
See application file for complete search history.

(56) References Cited

U.S. PATENT DOCUMENTS

| 8,024,453 | B2* | 9/2011 | Ahmed | H04L 43/50 709/224 |
| 8,386,604 | B1* | 2/2013 | Kay | G06F 11/3495 709/224 |
| 8,812,714 | B2 | 8/2014 | Sinha et al. | |
| 8,955,152 | B1* | 2/2015 | Enderwick | G06F 21/57 726/28 |
| 9,042,540 | B2 | 5/2015 | Tuchman et al. | |
| 9,218,602 | B2 | 12/2015 | Duan et al. | |
| 9,300,918 | B2* | 3/2016 | Kang | G06F 8/61 |
| 9,355,223 | B2* | 5/2016 | Qureshi | H04L 65/403 |
| 9,800,478 | B2 | 10/2017 | Lad et al. | |
| 10,255,584 | B2* | 4/2019 | Rein | G06F 40/174 |
| 2004/0215762 | A1* | 10/2004 | Oulu | H04L 67/34 709/223 |
| 2005/0262104 | A1* | 11/2005 | Robertson | H04L 41/5083 |
| 2006/0015573 | A1* | 1/2006 | Hurst-Hiller | G06F 16/9566 707/E17.115 |
| 2006/0230033 | A1* | 10/2006 | Halevy | G06F 40/174 |
| 2009/0089618 | A1* | 4/2009 | Rajan | G06F 11/3684 714/33 |
| 2009/0228779 | A1* | 9/2009 | Williamson | H04L 67/289 715/205 |

(Continued)

*Primary Examiner* — Lashonda Jacobs-Burton

(57) ABSTRACT

A computing device may include a memory and a processor cooperating with the memory to communicate with a plurality of client devices, and determine a problem with a Web application based upon received data from the client devices. The processor may further cause at least one of the plurality of client devices to display a graphical overlay over a Web application, with the graphical overlay including content related to the determined problem.

19 Claims, 13 Drawing Sheets

(56) References Cited

U.S. PATENT DOCUMENTS

| | | | |
|---|---|---|---|
| 2011/0126168 A1* | 5/2011 | Ilyayev | G06F 9/5072 |
| | | | 717/103 |
| 2011/0276836 A1* | 11/2011 | Kahana | G06Q 10/04 |
| | | | 714/38.1 |
| 2012/0023487 A1* | 1/2012 | Letca | H04L 67/10 |
| | | | 717/130 |
| 2012/0124422 A1 | 5/2012 | Hsiao et al. | |
| 2016/0063636 A1* | 3/2016 | Feimster | G06Q 40/08 |
| | | | 705/4 |
| 2017/0024269 A1* | 1/2017 | Shuvali | G06F 11/0742 |
| 2017/0060659 A1* | 3/2017 | Lee | G06F 11/0793 |
| 2017/0339250 A1* | 11/2017 | Momchilov | H04L 67/34 |
| 2018/0034685 A1* | 2/2018 | Naous | H04L 41/064 |
| 2018/0275846 A1* | 9/2018 | Perret | G06Q 10/1093 |
| 2018/0295134 A1 | 10/2018 | Gupta et al. | |
| 2019/0098096 A1* | 3/2019 | Mocanu | H04L 67/131 |
| 2019/0158569 A1* | 5/2019 | Singleton, IV | H04L 67/75 |
| 2019/0340341 A1* | 11/2019 | Fleck | G06F 21/10 |
| 2019/0342315 A1* | 11/2019 | Smelov | H04L 63/20 |
| 2020/0142552 A1* | 5/2020 | Borkar | G06F 3/0483 |
| 2020/0151083 A1* | 5/2020 | Chauhan | G06F 11/0751 |
| 2020/0153711 A1* | 5/2020 | Chauhan | H04L 41/5096 |
| 2020/0153911 A1* | 5/2020 | Chauhan | H04L 65/403 |
| 2020/0162359 A1* | 5/2020 | Borkar | H04L 43/50 |
| 2022/0051143 A1* | 2/2022 | Kobylkin | G06Q 30/02 |

* cited by examiner

170

CRM Application – Navigation Problem Report

New Customer Entry Form

Past 30 Days:

1. Submit error: missing "Account No." (337 occurrences)
2. Submit error: missing "Position" (128 occurrences)

*FIG. 11*

SYSTEM AND METHODS FOR PROVIDING USER ANALYTICS AND PERFORMANCE FEEDBACK FOR WEB APPLICATIONS

RELATED APPLICATIONS

This application is a continuation of U.S. patent application Ser. No. 16/550,480, which was filed Aug. 26, 2019 and issued as U.S. patent application Ser. No. 11,038,998, and which is incorporated here by reference in its entirety.

BACKGROUND

Web applications or apps are software programs that run on a server and are accessed remotely by client devices through a Web browser. That is, while Web apps have a similar functionality to native apps installed directly on the client device, Web apps are instead installed an run on the server, and only the browser application is installed on the client device (although in some implementations a hosted browser running on a virtualization server may be used to access Web apps as well). One advantage of using Web apps is that this allows client devices to run numerous different applications without having to install all of these applications on the client device. This may be particularly beneficial for thin client devices, which typically have reduced memory and processing capabilities. Moreover, updating Web applications may be easier than native applications, as updating is done at the server level rather than having to push out updates to numerous different types of client devices.

Software as a Service (SaaS) is a Web application licensing and delivery model in which apps are delivered remotely as a Web-based service, typically on a subscription basis. SaaS is used for delivering several different types of business (and other) applications, including office, database, accounting, customer relation management (CRM), etc.

SUMMARY

A computing device may include a memory and a processor cooperating with the memory to communicate with a plurality of client devices, and determine a problem with a Web application based upon received data from the client devices. The processor may further cause at least one of the plurality of client devices to display a graphical overlay over a Web application, with the graphical overlay including content related to the determined problem.

In an example embodiment, the Web application may comprise a Software as a Service (SaaS) application. By way of example, at least some of the client devices may access the Web application through managed browsers installed on the client devices, and the processor may receive the data from the managed browsers. In accordance with another example embodiment, the processor may be further configured to host browser sessions through which at least some of the client devices access the Web application and receive the data from the hosted browser sessions.

The data may comprise user navigation data, and the problem may comprise a user navigation problem, for example. In accordance with another example, the processor may determine the problem based upon a latency of the Web application. In still another example, the processor may determine the problem based upon a timing to complete a form within the Web application. The content may relate to correcting the determined problem, for example.

A related method may include, at a computing device, communicating with a plurality of client devices and determining a problem with a Web application based upon received data from the client devices. The computing device may further cause at least one of the plurality of client devices to display a graphical overlay over a Web application, with the graphical overlay including content related to the determined problem.

A related non-transitory computer-readable medium may have computer-executable instructions for causing a computing device to perform steps including communicating with a plurality of client devices, and determining a problem with a Web application based upon received data from the client devices. A further step may include causing at least one of the plurality of client devices to display a graphical overlay over a Web application, with the graphical overlay including content related to the determined problem.

BRIEF DESCRIPTION OF THE DRAWINGS

FIG. 11 is a screen shot of an example navigation problem report which may be generated by the server of the system of FIG. 6 across multiples instances of a Web application for different users.

DETAILED DESCRIPTION

Web app usability is normally left up to individual Independent Software Vendors (ISVs) or custom app developers to collect feedback from users either through embedded instrumentation, infrequent user surveys, or user complaints. Typically, usability problems are addressed on a one-by-one app basis and analyzed with variable detail depending on the ISV. That is, after feedback data is analyzed to determine the problem areas, design fixes have to be created and incorporated in future app development cycles, which may not only be time and labor intensive, but also may take a relatively long time before the problem is addressed.

Generally speaking, the approaches described herein may allow information technology (IT) personnel or others to collect user performance/navigation feedback data across multiple client or endpoint devices, such as through the Citrix Embedded Browser (CEB) in the Citrix Workspace App (CWA), and process this feedback data with an analytics engine to more rapidly identify user performance/navigation problems and generate an output to help circumvent or alleviate them. Data may be collected across multiple Web application sessions (including Web and/or SaaS apps) and users in an organization to identify problems with usability or app performance by leveraging machine learning. The systems and methods discussed herein also provide the ability for a contextual pop-up window to appear with recommended next steps, e.g., based on the typical behavior of other users. This capability runs across all web and SaaS apps in an organization and may advantageously be independent of the ISV/Developer of the underlying app.

Figure 1:
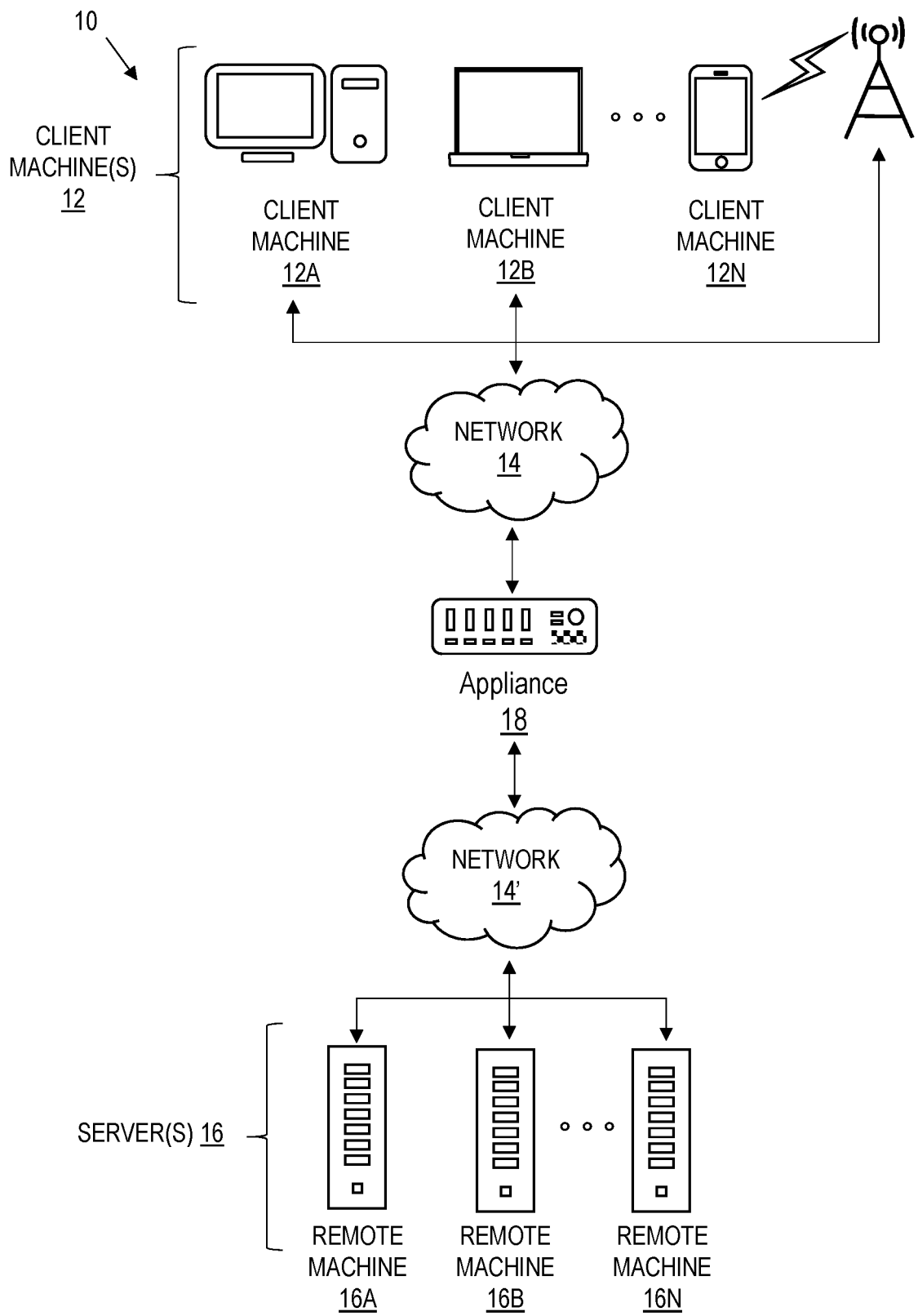
FIG. 1 is a schematic block diagram of a network environment of computing devices in which various aspects of the disclosure may be implemented.

Referring initially to FIG. 1, a non-limiting network environment 10 in which various aspects of the disclosure may be implemented includes one or more client machines 12A-12N, one or more remote machines 16A-16N, one or more networks 14, 14', and one or more appliances 18 installed within the computing environment 10. The client machines 12A-12N communicate with the remote machines 16A-16N via the networks 14, 14'.

In some embodiments, the client machines 12A-12N communicate with the remote machines 16A-16N via an intermediary appliance 18. The illustrated appliance 18 is positioned between the networks 14, 14' and may also be referred to as a network interface or gateway. In some embodiments, the appliance 108 may operate as an application delivery controller (ADC) to provide clients with access to business applications and other data deployed in a data center, the cloud, or delivered as Software as a Service (SaaS) across a range of client devices, and/or provide other functionality such as load balancing, etc. In some embodiments, multiple appliances 18 may be used, and the appliance(s) 18 may be deployed as part of the network 14 and/or 14'.

The client machines 12A-12N may be generally referred to as client machines 12, local machines 12, clients 12, client nodes 12, client computers 12, client devices 12, computing devices 12, endpoints 12, or endpoint nodes 12. The remote machines 16A-16N may be generally referred to as servers 16 or a server farm 16. In some embodiments, a client device 12 may have the capacity to function as both a client node seeking access to resources provided by a server 16 and as a server 16 providing access to hosted resources for other client devices 12A-12N. The networks 14, 14' may be generally referred to as a network 14. The networks 14 may be configured in any combination of wired and wireless networks.

A server 16 may be any server type such as, for example: a file server; an application server; a web server; a proxy server; an appliance; a network appliance; a gateway; an application gateway; a gateway server; a virtualization server; a deployment server; a Secure Sockets Layer Virtual Private Network (SSL VPN) server; a firewall; a web server; a server executing an active directory; a cloud server; or a server executing an application acceleration program that provides firewall functionality, application functionality, or load balancing functionality.

A server 16 may execute, operate or otherwise provide an application that may be any one of the following: software; a program; executable instructions; a virtual machine; a hypervisor; a web browser; a web-based client; a client-server application; a thin-client computing client; an ActiveX control; a Java applet; software related to voice over internet protocol (VoIP) communications like a soft IP telephone; an application for streaming video and/or audio; an application for facilitating real-time-data communications; a HTTP client; a FTP client; an Oscar client; a Telnet client; or any other set of executable instructions.

In some embodiments, a server 16 may execute a remote presentation services program or other program that uses a thin-client or a remote-display protocol to capture display output generated by an application executing on a server 16 and transmit the application display output to a client device 12.

In yet other embodiments, a server 16 may execute a virtual machine providing, to a user of a client device 12, access to a computing environment. The client device 12 may be a virtual machine. The virtual machine may be managed by, for example, a hypervisor, a virtual machine manager (VMM), or any other hardware virtualization technique within the server 16.

In some embodiments, the network 14 may be: a local-area network (LAN); a metropolitan area network (MAN); a wide area network (WAN); a primary public network 14; and a primary private network 14. Additional embodiments may include a network 14 of mobile telephone networks that use various protocols to communicate among mobile devices. For short range communications within a wireless local-area network (WLAN), the protocols may include 802.11, Bluetooth, and Near Field Communication (NFC).

Figure 2:
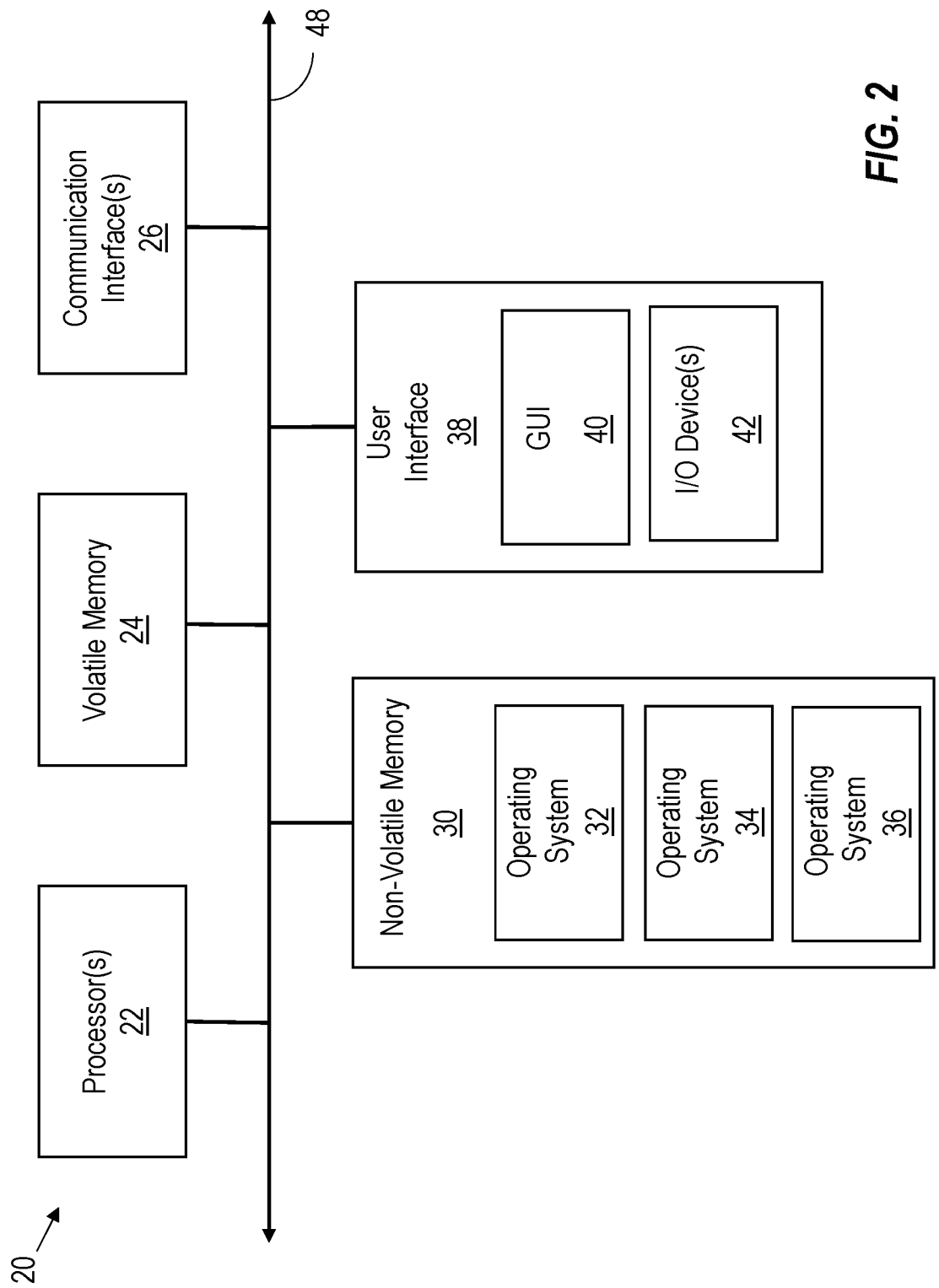
FIG. 2 is a schematic block diagram of a computing device useful for practicing an embodiment of the client machines or the remote machines illustrated in FIG. 1.

FIG. 2 depicts a block diagram of a computing device 20 useful for practicing an embodiment of client devices 12, appliances 18 and/or servers 16. The computing device 20 includes one or more processors 22, volatile memory 24 (e.g., random access memory (RAM)), non-volatile memory 30, user interface (UI) 38, one or more communications interfaces 26, and a communications bus 48.

The non-volatile memory 30 may include: one or more hard disk drives (HDDs) or other magnetic or optical storage media; one or more solid state drives (SSDs), such as a flash drive or other solid-state storage media; one or more hybrid magnetic and solid-state drives; and/or one or more virtual storage volumes, such as a cloud storage, or a combination of such physical storage volumes and virtual storage volumes or arrays thereof.

The user interface 38 may include a graphical user interface (GUI) 40 (e.g., a touchscreen, a display, etc.) and one or more input/output (I/O) devices 42 (e.g., a mouse, a keyboard, a microphone, one or more speakers, one or more cameras, one or more biometric scanners, one or more environmental sensors, and one or more accelerometers, etc.).

The non-volatile memory 30 stores an operating system 32, one or more applications 34, and data 36 such that, for example, computer instructions of the operating system 32 and/or the applications 34 are executed by processor(s) 22 out of the volatile memory 24. In some embodiments, the volatile memory 24 may include one or more types of RAM and/or a cache memory that may offer a faster response time than a main memory. Data may be entered using an input device of the GUI 40 or received from the I/O device(s) 42. Various elements of the computer 20 may communicate via the communications bus 48.

The illustrated computing device 20 is shown merely as an example client device or server, and may be implemented by any computing or processing environment with any type of machine or set of machines that may have suitable hardware and/or software capable of operating as described herein.

The processor(s) 22 may be implemented by one or more programmable processors to execute one or more executable instructions, such as a computer program, to perform the functions of the system. As used herein, the term "processor" describes circuitry that performs a function, an operation, or a sequence of operations. The function, operation, or sequence of operations may be hard coded into the circuitry or soft coded by way of instructions held in a memory device and executed by the circuitry. A processor may perform the function, operation, or sequence of operations using digital values and/or using analog signals.

In some embodiments, the processor can be embodied in one or more application specific integrated circuits (ASICs), microprocessors, digital signal processors (DSPs), graphics processing units (GPUs), microcontrollers, field programmable gate arrays (FPGAs), programmable logic arrays (PLAs), multi-core processors, or general-purpose computers with associated memory.

The processor 22 may be analog, digital or mixed-signal. In some embodiments, the processor 22 may be one or more physical processors, or one or more virtual (e.g., remotely located or cloud) processors. A processor including multiple processor cores and/or multiple processors may provide functionality for parallel, simultaneous execution of instructions or for parallel, simultaneous execution of one instruction on more than one piece of data.

The communications interfaces 26 may include one or more interfaces to enable the computing device 20 to access a computer network such as a Local Area Network (LAN), a Wide Area Network (WAN), a Personal Area Network (PAN), or the Internet through a variety of wired and/or wireless connections, including cellular connections.

In described embodiments, the computing device 20 may execute an application on behalf of a user of a client device. For example, the computing device 20 may execute one or more virtual machines managed by a hypervisor. Each virtual machine may provide an execution session within which applications execute on behalf of a user or a client device, such as a hosted desktop session. The computing device 20 may also execute a terminal services session to provide a hosted desktop environment. The computing device 20 may provide access to a remote computing environment including one or more applications, one or more desktop applications, and one or more desktop sessions in which one or more applications may execute.

An example virtualization server 16 may be implemented using Citrix Hypervisor provided by Citrix Systems, Inc., of Fort Lauderdale, Fla. ("Citrix Systems"). Virtual app and desktop sessions may further be provided by Citrix Virtual Apps and Desktops (CVAD), also from Citrix Systems. Citrix Virtual Apps and Desktops is an application virtualization solution that enhances productivity with universal access to virtual sessions including virtual app, desktop, and data sessions from any device, plus the option to implement a scalable VDI solution. Virtual sessions may further include Software as a Service (SaaS) and Desktop as a Service (DaaS) sessions, for example.

Figure 3:
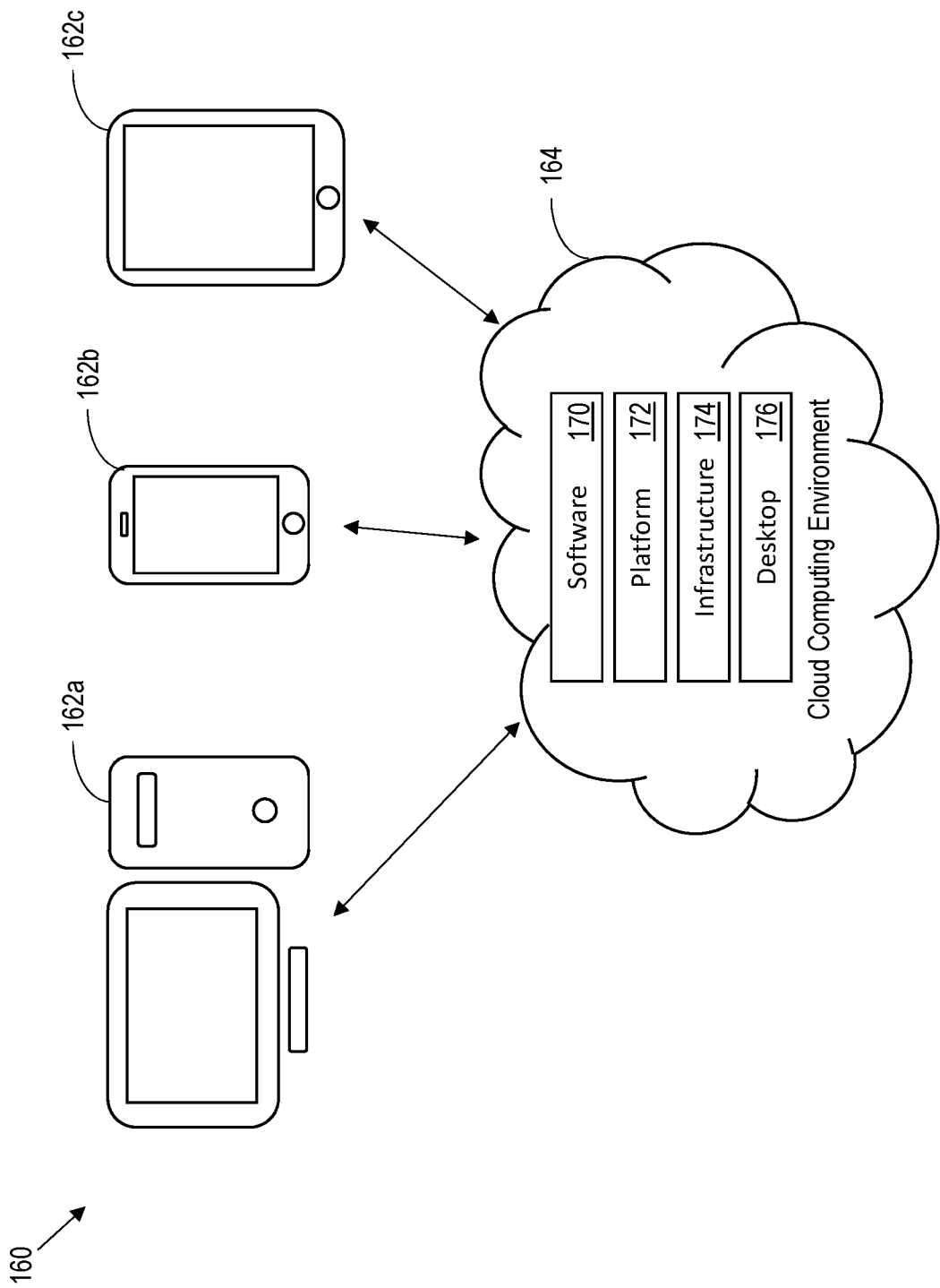
FIG. 3 is a schematic block diagram of a cloud computing environment in which various aspects of the disclosure may be implemented.

Referring to FIG. 3, a cloud computing environment 50 is depicted, which may also be referred to as a cloud environment, cloud computing or cloud network. The cloud computing environment 50 can provide the delivery of shared computing services and/or resources to multiple users or tenants. For example, the shared resources and services can include, but are not limited to, networks, network bandwidth, servers, processing, memory, storage, applications, virtual machines, databases, software, hardware, analytics, and intelligence.

In the cloud computing environment 50, one or more clients 52A-52C (such as those described above) are in communication with a cloud network 54. The cloud network 54 may include backend platforms, e.g., servers, storage, server farms or data centers. The users or clients 52A-52C can correspond to a single organization/tenant or multiple organizations/tenants. More particularly, in one example implementation the cloud computing environment 50 may provide a private cloud serving a single organization (e.g., enterprise cloud). In another example, the cloud computing environment 50 may provide a community or public cloud serving multiple organizations/tenants. In still further embodiments, the cloud computing environment 50 may provide a hybrid cloud that is a combination of a public cloud and a private cloud. Public clouds may include public servers that are maintained by third parties to the clients 52A-52C or the enterprise/tenant. The servers may be located off-site in remote geographical locations or otherwise.

The cloud computing environment 50 can provide resource pooling to serve multiple users via clients 52A-52C through a multi-tenant environment or multi-tenant model with different physical and virtual resources dynamically assigned and reassigned responsive to different demands within the respective environment. The multi-tenant environment can include a system or architecture that can provide a single instance of software, an application or a software application to serve multiple users. In some embodiments, the cloud computing environment 50 can provide on-demand self-service to unilaterally provision computing capabilities (e.g., server time, network storage) across a network for multiple clients 52A-52C. The cloud computing environment 50 can provide an elasticity to dynamically scale out or scale in responsive to different demands from one or more clients 52. In some embodiments, the computing environment 50 can include or provide monitoring services to monitor, control and/or generate reports corresponding to the provided shared services and resources.

In some embodiments, the cloud computing environment 50 may provide cloud-based delivery of different types of cloud computing services, such as Software as a service (SaaS) 56, Platform as a Service (PaaS) 58, Infrastructure as a Service (IaaS) 60, and Desktop as a Service (DaaS) 62, for example. IaaS may refer to a user renting the use of infrastructure resources that are needed during a specified time period. IaaS providers may offer storage, networking, servers or virtualization resources from large pools, allowing the users to quickly scale up by accessing more resources as needed. Examples of IaaS include AMAZON WEB SERVICES provided by Amazon.com, Inc., of Seattle, Wash., RACKSPACE CLOUD provided by Rackspace US, Inc., of San Antonio, Tex., Google Compute Engine provided by Google Inc. of Mountain View, Calif., or RIGHTSCALE provided by RightScale, Inc., of Santa Barbara, Calif.

PaaS providers may offer functionality provided by IaaS, including, e.g., storage, networking, servers or virtualization, as well as additional resources such as, e.g., the operating system, middleware, or runtime resources. Examples of PaaS include WINDOWS AZURE provided by Microsoft Corporation of Redmond, Wash., Google App Engine provided by Google Inc., and HEROKU provided by Heroku, Inc. of San Francisco, Calif.

SaaS providers may offer the resources that PaaS provides, including storage, networking, servers, virtualization, operating system, middleware, or runtime resources. In some embodiments, SaaS providers may offer additional resources including, e.g., data and application resources. Examples of SaaS include GOOGLE APPS provided by Google Inc., SALESFORCE provided by Salesforce.com Inc. of San Francisco, Calif., or OFFICE 365 provided by Microsoft Corporation. Examples of SaaS may also include data storage providers, e.g. DROPBOX provided by Dropbox, Inc. of San Francisco, Calif., Microsoft SKYDRIVE provided by Microsoft Corporation, Google Drive provided by Google Inc., or Apple ICLOUD provided by Apple Inc. of Cupertino, Calif.

Similar to SaaS, DaaS (which is also known as hosted desktop services) is a form of virtual desktop infrastructure (VDI) in which virtual desktop sessions are typically delivered as a cloud service along with the apps used on the virtual desktop. Citrix Cloud is one example of a DaaS delivery platform. DaaS delivery platforms may be hosted on a public cloud computing infrastructure such as AZURE CLOUD from Microsoft Corporation of Redmond, Wash. (herein "Azure"), or AMAZON WEB SERVICES provided by Amazon.com, Inc., of Seattle, Wash. (herein "AWS"), for example. In the case of Citrix Cloud, Citrix Workspace app may be used as a single-entry point for bringing apps, files and desktops together (whether on-premises or in the cloud) to deliver a unified experience.

Figure 4:
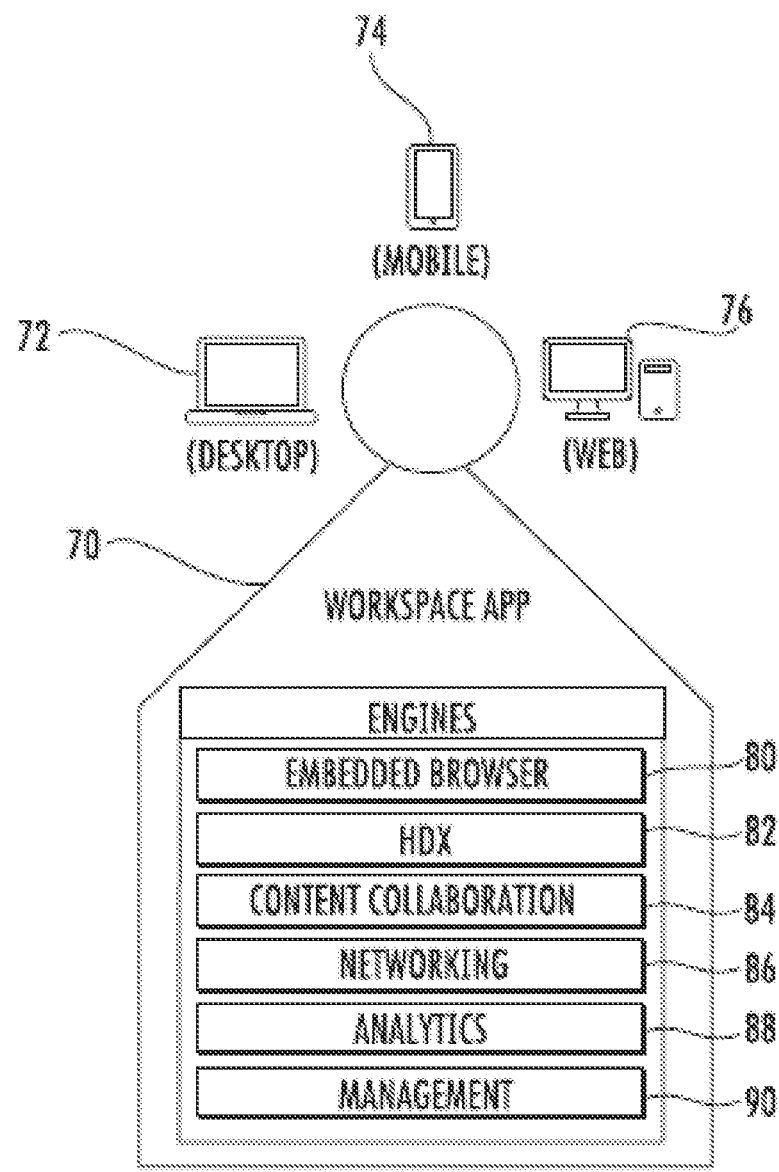
FIG. 4 is a schematic block diagram of desktop, mobile and web based devices operating a workspace app in which various aspects of the disclosure may be implemented.

The unified experience provided by the Citrix Workspace app will now be discussed in greater detail with reference to FIG. 4. The Citrix Workspace app will be generally referred to herein as the workspace app 70. The workspace app 70 is how a user gets access to their workspace resources, one category of which is applications. These applications can be SaaS apps, Web apps or virtual apps. The workspace app 70 also gives users access to their desktops, which may be a local desktop or a virtual desktop. Further, the workspace app 70 gives users access to their files and data, which may be stored in numerous repositories. The files and data may be hosted on Citrix ShareFile, hosted on an on-premises network file server, or hosted in some other cloud storage provider, such as Microsoft OneDrive or Google Drive Box, for example.

To provide a unified experience, all of the resources a user requires may be located and accessible from the workspace app 70. The workspace app 70 is provided in different versions. One version of the workspace app 70 is an installed application for desktops 72, which may be based on Windows, Mac or Linux platforms. A second version of the workspace app 70 is an installed application for mobile devices 74, which may be based on iOS or Android platforms. A third version of the workspace app 70 uses a hypertext markup language (HTML) browser to provide a user access to their workspace environment. The web version of the workspace app 70 is used when a user does not want to install the workspace app or does not have the rights to install the workspace app, such as when operating a public kiosk 76.

Each of these different versions of the workspace app 70 may advantageously provide the same user experience. This advantageously allows a user to move from client device 72 to client device 74 to client device 76 in different platforms and still receive the same user experience for their workspace. The client devices 72, 74 and 76 are referred to as endpoints.

As noted above, the workspace app 70 supports Windows, Mac, Linux, iOS, and Android platforms as well as platforms with an HTML browser (HTML5). The workspace app 70 incorporates multiple engines 80-90 allowing users access to numerous types of app and data resources. Each engine 80-90 optimizes the user experience for a particular resource. Each engine 80-90 also provides an organization or enterprise with insights into user activities and potential security threats.

An embedded browser engine 80 keeps SaaS and Web apps contained within the workspace app 70 instead of launching them on a locally installed and unmanaged browser. With the embedded browser, the workspace app 70 is able to intercept user-selected hyperlinks in SaaS and Web apps and request a risk analysis before approving, denying, or isolating access.

A high definition experience (HDX) engine 82 establishes connections to virtual browsers, virtual apps and desktop sessions running on either Windows or Linux operating systems. With the HDX engine 82, Windows and Linux resources run remotely, while the display remains local, on the endpoint. To provide the best possible user experience, the HDX engine 82 utilizes different virtual channels to adapt to changing network conditions and application requirements. To overcome high-latency or high-packet loss networks, the HDX engine 82 automatically implements optimized transport protocols and greater compression algorithms. Each algorithm is optimized for a certain type of display, such as video, images, or text. The HDX engine 82 identifies these types of resources in an application and applies the most appropriate algorithm to that section of the screen.

For many users, a workspace centers on data. A content collaboration engine 84 allows users to integrate all data into the workspace, whether that data lives on-premises or in the cloud. The content collaboration engine 84 allows administrators and users to create a set of connectors to corporate and user-specific data storage locations. This can include OneDrive, Dropbox, and on-premises network file shares, for example. Users can maintain files in multiple repositories and allow the workspace app 70 to consolidate them into a single, personalized library.

A networking engine 86 identifies whether or not an endpoint or an app on the endpoint requires network connectivity to a secured backend resource. The networking engine 86 can automatically establish a full VPN tunnel for the entire endpoint device, or it can create an app-specific p-VPN connection. A p-VPN defines what backend resources an application and an endpoint device can access, thus protecting the backend infrastructure. In many instances, certain user activities benefit from unique network-based optimizations. If the user requests a file copy, the workspace app 70 can automatically utilize multiple network connections simultaneously to complete the activity faster. If the user initiates a VoIP call, the workspace app 70 improves its quality by duplicating the call across multiple network connections. The networking engine 86 uses only the packets that arrive first.

An analytics engine 88 reports on the user's device, location and behavior, where cloud-based services identify any potential anomalies that might be the result of a stolen device, a hacked identity or a user who is preparing to leave the company. The information gathered by the analytics engine 88 protects company assets by automatically implementing counter-measures.

A management engine 90 keeps the workspace app 70 current. This not only provides users with the latest capabilities, but also includes extra security enhancements. The workspace app 70 includes an auto-update service that routinely checks and automatically deploys updates based on customizable policies.

Figure 5:
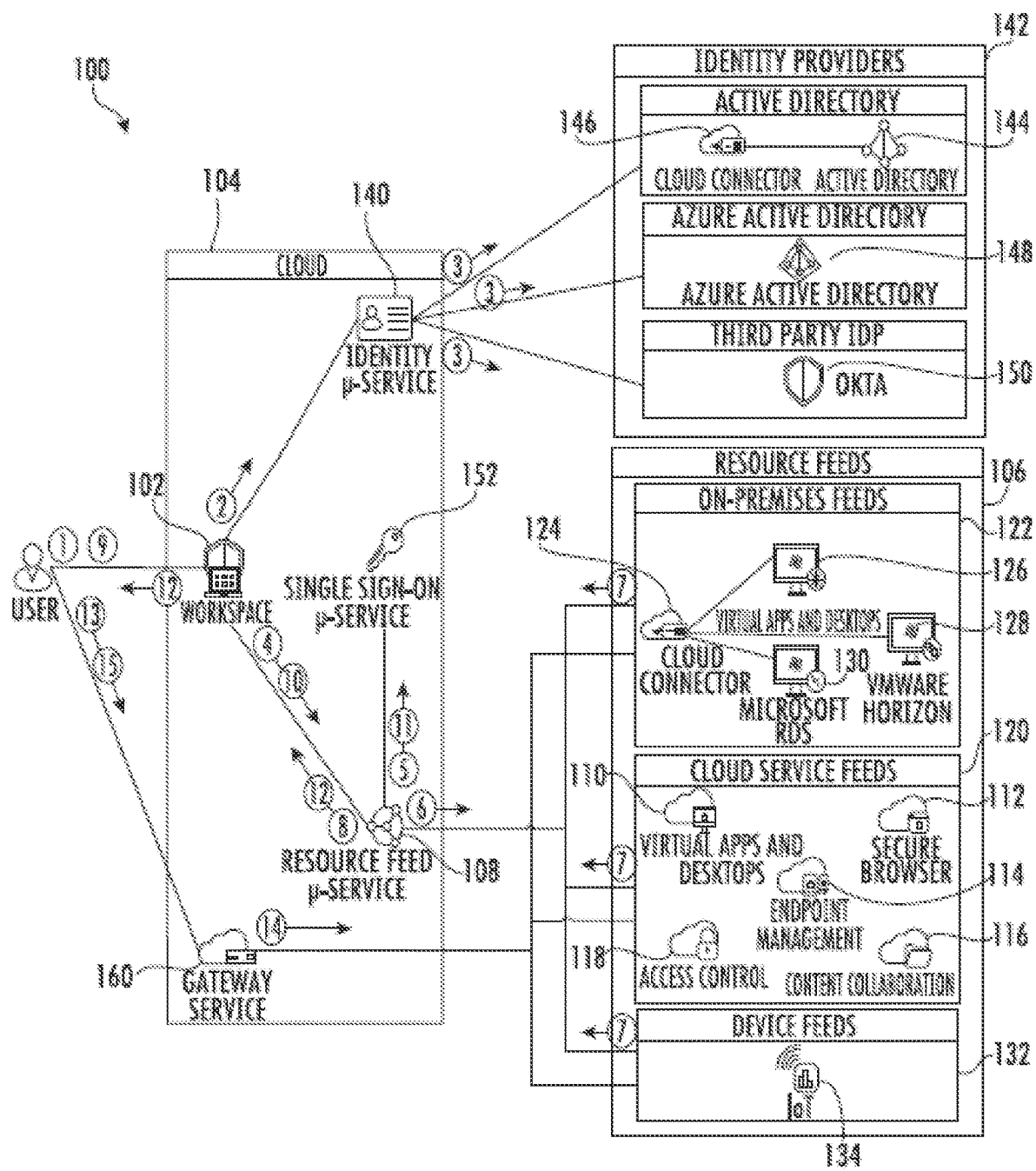
FIG. 5 is a schematic block diagram of a workspace network environment of computing devices in which various aspects of the disclosure may be implemented.

Referring now to FIG. 5, a workspace network environment 100 providing a unified experience to a user based on the workspace app 70 will be discussed. The desktop, mobile and web versions of the workspace app 70 all communicate with the workspace experience service 102 running within the Citrix Cloud 104. The workspace experience service 102 then pulls in all the different resource feeds 16 via a resource feed micro-service 108. That is, all the different resources from other services running in the Citrix Cloud 104 are pulled in by the resource feed micro-service 108. The different services may include a virtual apps and desktop service 110, a secure browser service 112, an endpoint management service 114, a content collaboration service 116, and an access control service 118. Any service that an organization or enterprise subscribes to are automatically pulled into the workspace experience service 102 and delivered to the user's workspace app 70.

In addition to cloud feeds 120, the resource feed micro-service 108 can pull in on-premises feeds 122. A cloud connector 124 is used to provide virtual apps and desktop deployments that are running in an on-premises data center. Desktop virtualization may be provided by Citrix virtual apps and desktops 126, Microsoft RDS 128 or VMware Horizon 130, for example. In addition to cloud feeds 120 and on-premises feeds 122, device feeds 132 from Internet of Thing (IoT) devices 134, for example, may be pulled in by the resource feed micro-service 108. Site aggregation is used to tie the different resources into the user's overall workspace experience.

The cloud feeds 120, on-premises feeds 122 and device feeds 132 each provides the user's workspace experience with a different and unique type of application. The workspace experience can support local apps, SaaS apps, virtual apps, and desktops browser apps, as well as storage apps. As the feeds continue to increase and expand, the workspace experience is able to include additional resources in the user's overall workspace. This means a user will be able to get to every single application that they need access to.

Still referring to the workspace network environment 20, a series of events will be described on how a unified experience is provided to a user. The unified experience starts with the user using the workspace app 70 to connect to the workspace experience service 102 running within the Citrix Cloud 104, and presenting their identity (event 1). The identity includes a user name and password, for example.

The workspace experience service 102 forwards the user's identity to an identity micro-service 140 within the Citrix Cloud 104 (event 2). The identity micro-service 140 authenticates the user to the correct identity provider 142 (event 3) based on the organization's workspace configuration. Authentication may be based on an on-premises active directory 144 that requires the deployment of a cloud connector 146. Authentication may also be based on Azure Active Directory 148 or even a third party identity provider 150, such as Citrix ADC or Okta, for example.

Once authorized, the workspace experience service 102 requests a list of authorized resources (event 4) from the resource feed micro-service 108. For each configured resource feed 106, the resource feed micro-service 108 requests an identity token (event 5) from the single-sign micro-service 152.

The resource feed specific identity token is passed to each resource's point of authentication (event 6). On-premises resources 122 are contacted through the Citrix Cloud Connector 124. Each resource feed 106 replies with a list of resources authorized for the respective identity (event 7).

The resource feed micro-service 108 aggregates all items from the different resource feeds 106 and forwards (event 8) to the workspace experience service 102. The user selects a resource from the workspace experience service 102 (event 9).

The workspace experience service 102 forwards the request to the resource feed micro-service 108 (event 10). The resource feed micro-service 108 requests an identity token from the single sign-on micro-service 152 (event 11). The user's identity token is sent to the workspace experience service 102 (event 12) where a launch ticket is generated and sent to the user.

The user initiates a secure session to a gateway service 160 and presents the launch ticket (event 13). The gateway service 160 initiates a secure session to the appropriate resource feed 106 and presents the identity token to seamlessly authenticate the user (event 14). Once the session initializes, the user is able to utilize the resource (event 15). Having an entire workspace delivered through a single access point or application advantageously improves productivity and streamlines common workflows for the user.

Figure 6:
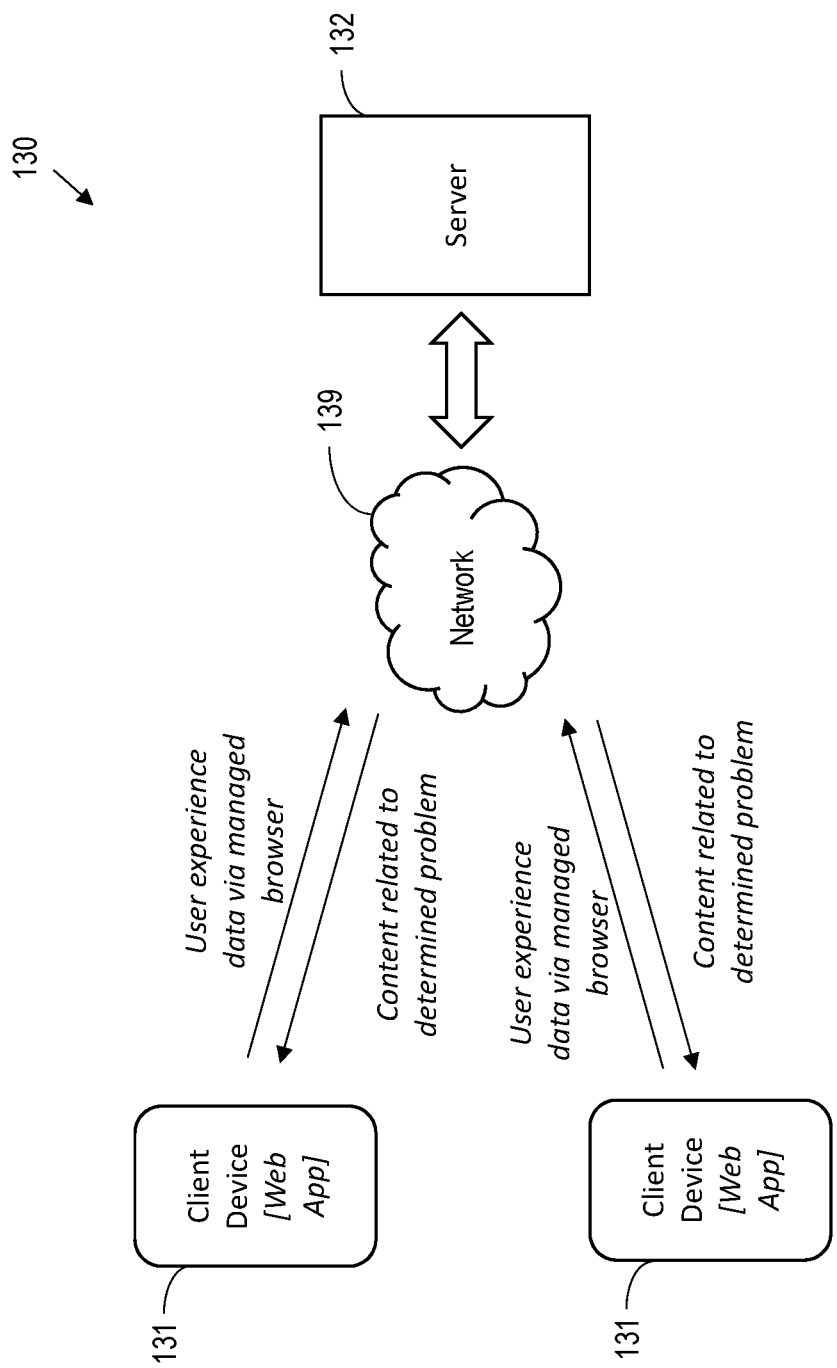
FIG. 6 is a schematic block diagram of a computing system providing user analytics and performance feedback for Web applications in accordance with an example implementation.

Turning to FIG. 6, a computing system 130 is now described which may advantageously identify user experience problems across numerous instances of one or more Web applications (apps), and readily provide for on-screen content or instructions outside of the virtual app to address these problems. In the illustrated example, the computing system 130 includes a plurality of client devices 131, such as those discussed above, which are configured to remotely access Web applications via managed browsers via one or more networks 139 (e.g., the Web). As will be discussed further below, the managed browsers may take the form of embedded browsers which are installed and run on the client devices 31 (e.g., Citrix Embedded Browser, or CEB, which is part of CWA), as well as hosted browsers that are run by a virtualization service (e.g., Citrix Secure Browser).

The managed browsers may advantageously collect data relating to user experience, such as user performance or navigation data, for different virtual apps run within the browsers. Moreover, this data may be collected across different client devices 131, users, and even across different user bases (e.g., from different entities or organizations). The system 130 further illustratively includes one or more servers 132 which may be configured to receive the user performance data from the managed browsers across the different Web application sessions, and utilize machine learning to determine a problem (e.g., a performance problem) within a given Web application based upon the collected user performance data. This advantageously allows the server 132 to provide instructions to the corresponding client device 131 that needs to circumvent or correct the performance problem.

For example, as will be discussed further below, the hosted browser may advantageously overlay a pop-up window over the Web application including the instructions provided by the server 132 to advantageously help the user navigate around or circumvent the problem that the server 132 identified based upon the performance of other users with the same Web application. As will be discussed further below, the overlay may be a window, indicator, etc., that is generated separately from the Web application and layered or displayed on top of the underlying Web application.

Figure 7:
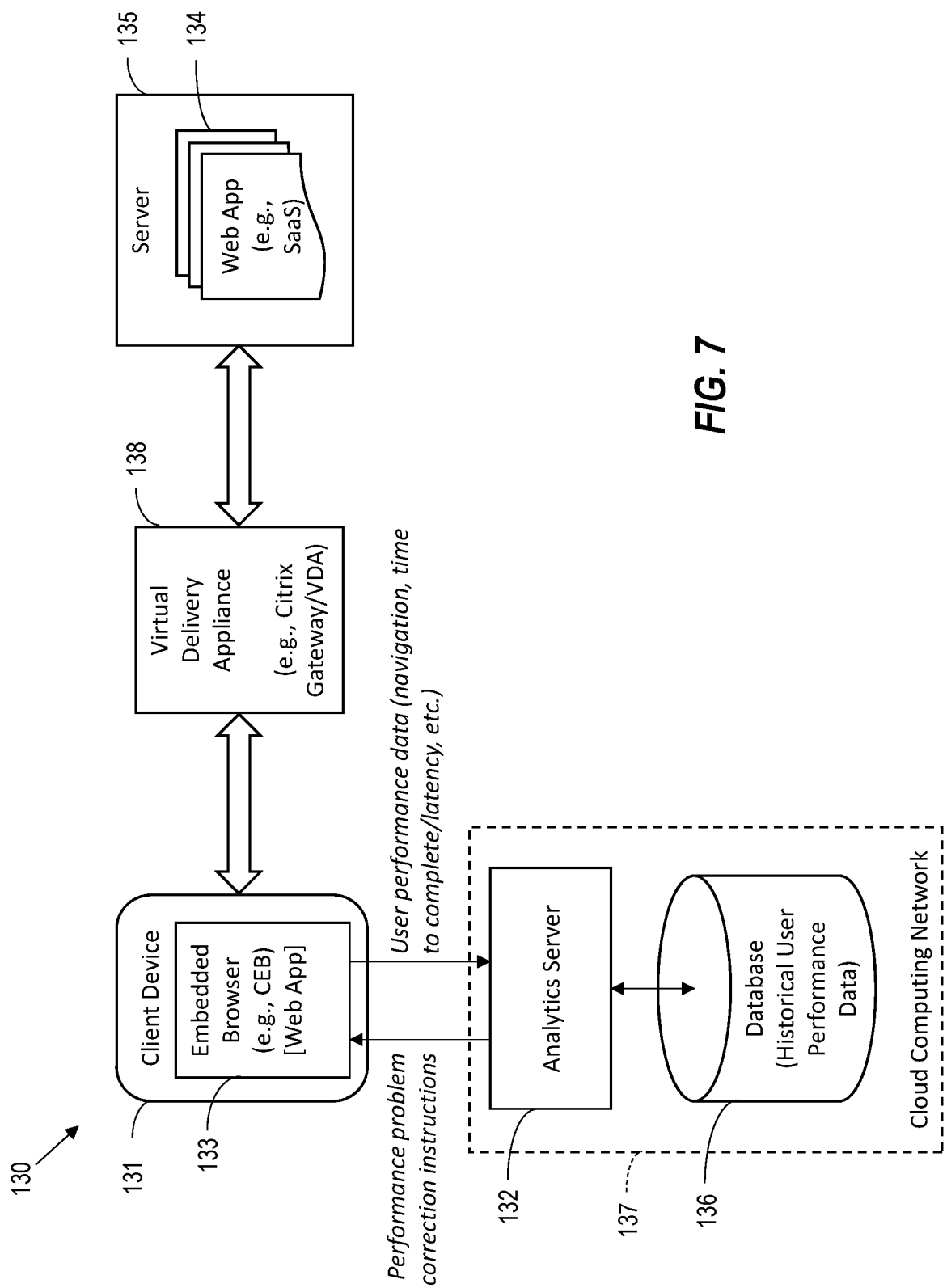
FIG. 7 is a schematic block diagram of another example implementation of the computing system of FIG. 4.

Referring additionally to FIG. 7, an example implementation of the system 130 is now described in which a client device 131 illustratively includes an embedded browser 133

(e.g., CEB) through which the client device remotely accesses Web app sessions 134 hosted by one or more servers 135. Managed browsers, such as the embedded browser 133, allow information technology (IT) personnel and/or virtualization service providers the ability to control the browser task bar that is provided with a Web app running therein, so that different features (e.g., printing, etc.) may be selectively enabled for users. This may be beneficial or otherwise helpful for users in that it makes common tasks or options that are not otherwise provided by the Web app readily available. Moreover, managed browsers may also allow for water marks or other "pop-ups" to be overlayed on a Web application running within the embedded browser 133. While this functionality is generally used for security purposes, such as to prevent users from taking pictures and stealing sensitive data, such functionality may also be leveraged to provide overlays or windows on top of the Web application running within the embedded browser 133 to help assist the user when various performance problems are detected.

In the illustrated example, the Web app sessions 134 are SaaS application sessions (e.g., Salesforce, Workday, etc.), but it will be appreciated that in some embodiments other types of Web applications may be used. One such example is Web apps that are delivered via a virtual session, such as through the Citrix Embedded Browser hosted on Citrix Server, with a UI delivered to CWA via Independent Computing Architecture (ICA) or Citrix high definition experience (HDX) technologies. Also in the illustrated example, one or more virtual delivery appliances 138 (e.g., Citrix Gateway and/or Citrix VDA) are used to connect the client devices 131 to the appropriate Web app sessions 134 on respective virtualization servers 135, as discussed further above.

The client device 131 will provide a feed from the embedded browser 133 to the server 132 (e.g., when apps open/close, browser commands, etc.). This information may further include what uniform resource locator (URL) the user is looking at, timing that it took to complete a form, whether anything was ever submitted, etc. For example, a sub-URL inside a Web application 134 may correspond to a unique form, etc., thereby identifying specifically where a problem is occurring.

In the present example, the server 132 is an analytics server which performs machine learning on the user performance data that is received from the embedded browsers 133 (or other hosted browsers) for the client devices 131 across the given user group. Here again, the user group could be for a particular group of users (e.g., within a given entity or organization), or it may include multiple different groups of users. The analytics server 132 may store historical user performance data in a database 136, for example, and in the illustrated example the analytics server and database are implemented within a cloud computing network or service 137, although they need not be in all embodiments.

Various types of supervised (e.g., trained with truth data) and unsupervised (untrained) machine learning approaches or models may be used by the analytics server 132 that can determine user behavior associated with poor navigation or understanding of the app. Example machine learning techniques include linear and logistic regressions, Bayes algorithms, K-Nearest Neighbor (KNN) algorithms, etc. The analytics server 132 may also look at steps before a problem happens to see if the user made a direct submission or performed wasted steps before hand, if desired.

The embedded browser 133 advantageously tracks movements associated with user inputs via user interface (UI) devices, such as a touch screen, mouse, keypad, etc. Such information may include URLs accessed, mouse clicks, what text is being submitted in a form, how long a user dwells on a page (e.g., a form page), whether a user exits a form without submitting any text, etc. The analytics server 132 may accordingly utilize the above-noted machine learning techniques to determine what types of inputs are associated with successful user performance (e.g., navigation of a page within a certain period of time, correct submission of information through a form, etc.), and conversely user inputs or actions that result in unsuccessful user performance. As such, when unsuccessful user input is received, the server 132 is able to suggest alternative user input/actions that will lead to a successful outcome. In some embodiments, the analytics server 132 and database 136 could be part of the server 135.

Figure 8:
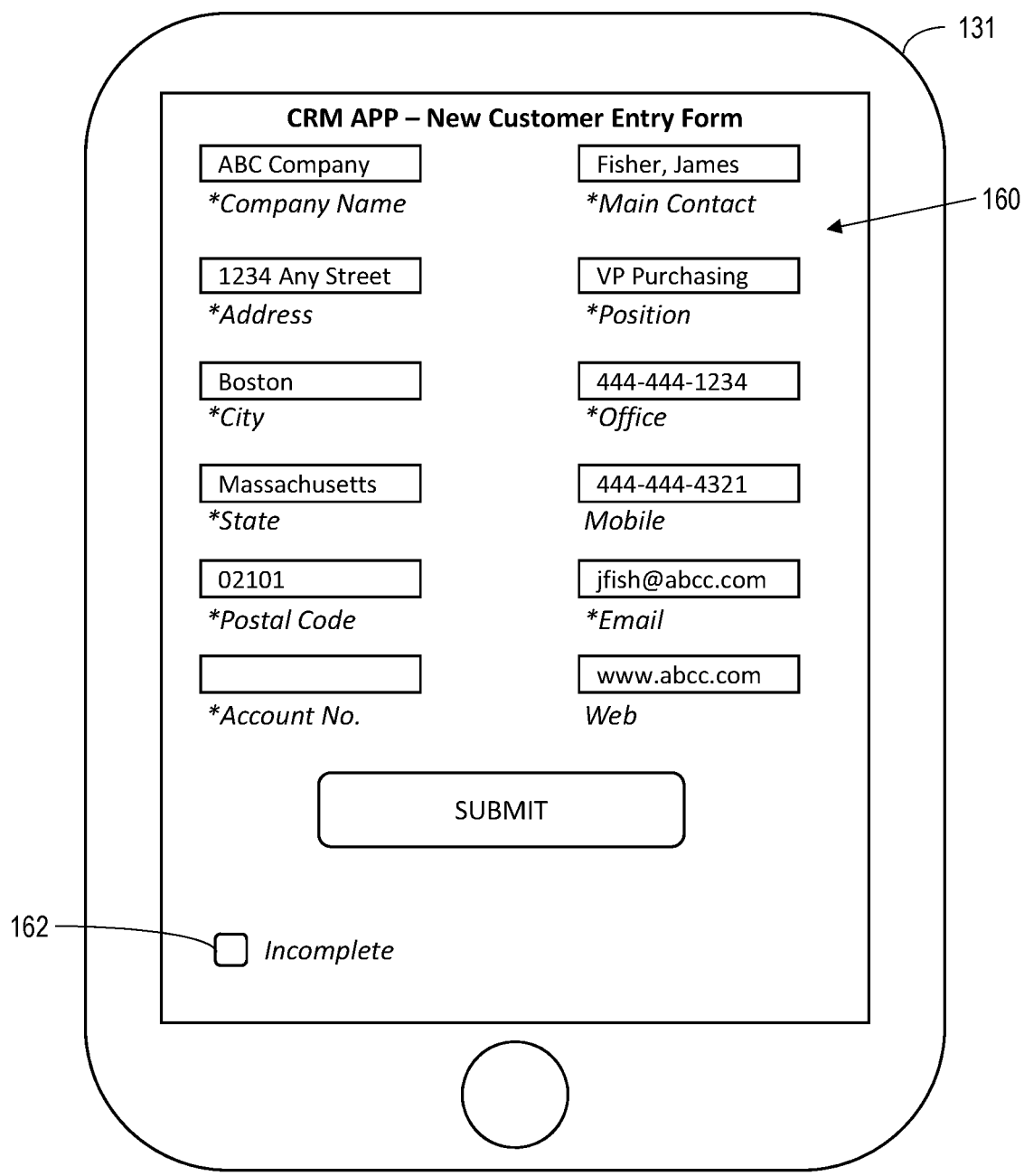
FIGS. 8-10 are a series of client device display views illustrating an approach to providing on-screen instructions to correct a user navigation/latency problem with the system of FIG. 4.
Figure 9:
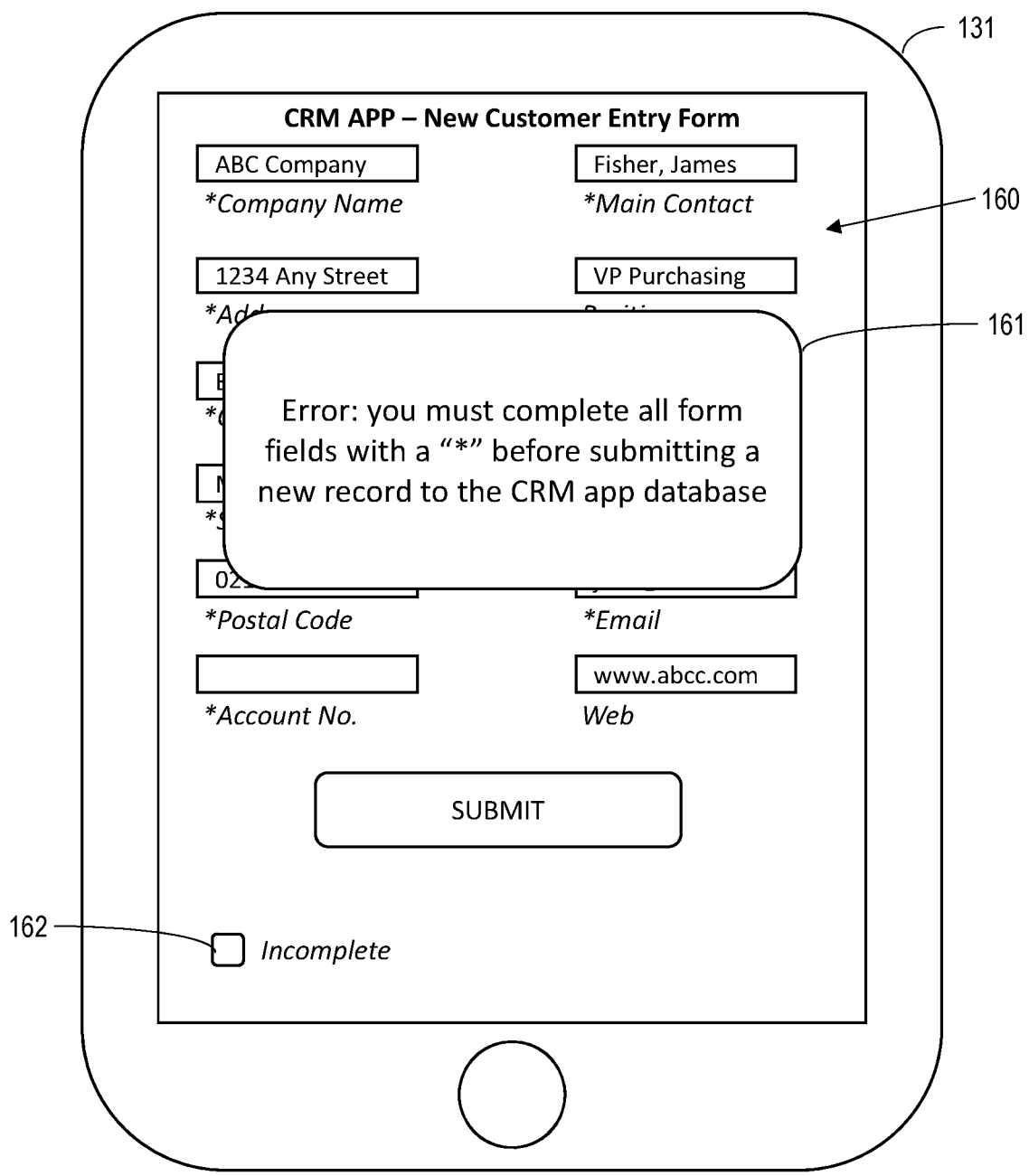
Figure 10:
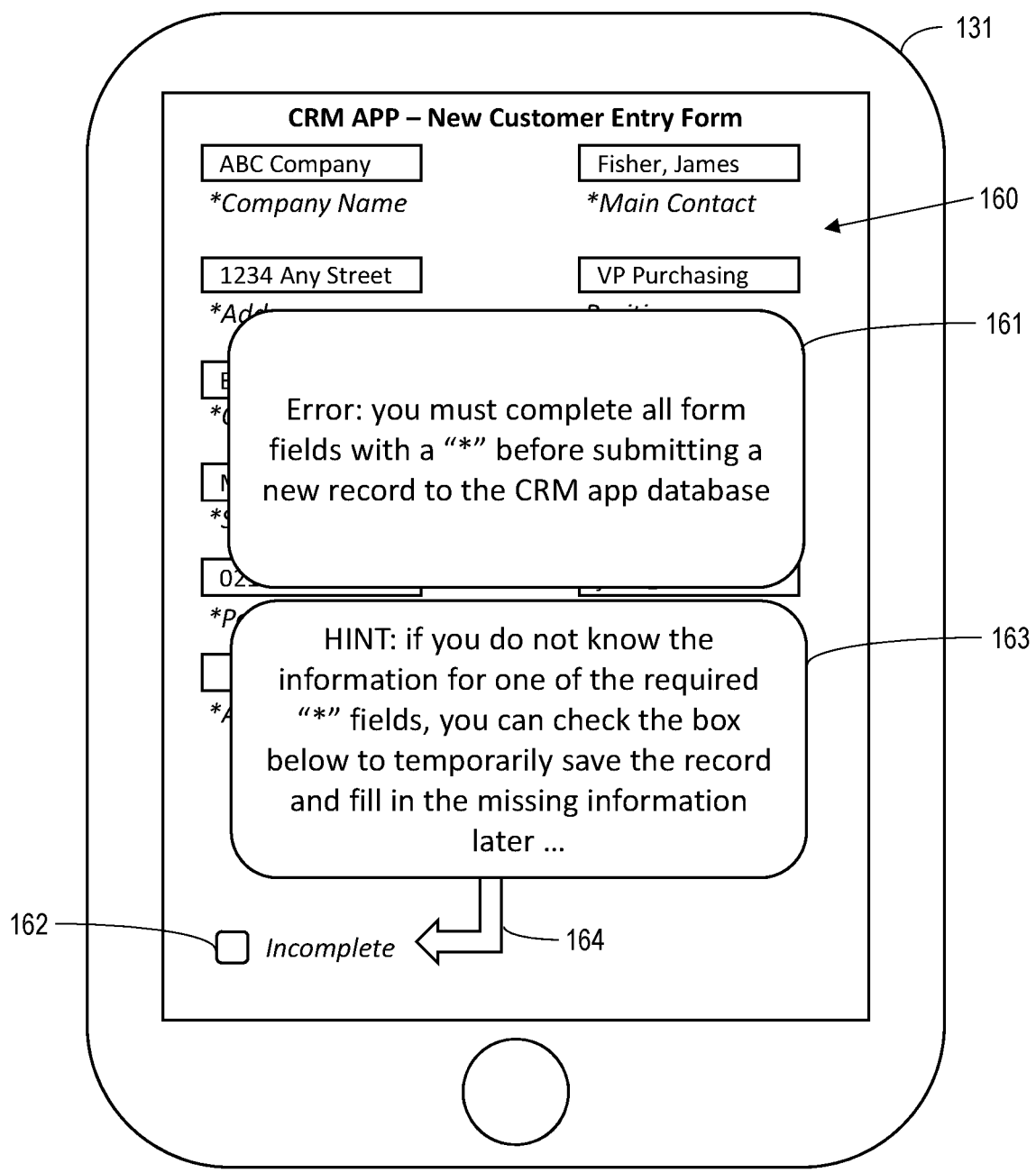

The foregoing will be further understood with reference to the example shown in FIGS. 8-10, in which a customer relationship management (CRM) application session is running within the embedded browser 133 (see FIG. 5) on the client device 131. More particularly, a new customer entry form 160 is being displayed, which has been filled out by a user of the client device 131 to include all of the appropriate customer information fields with the exception of an account number field. The CRM app has a built-in error checking routine that enforces mandatory data submission for certain form fields in the form 160 (which are indicated with an asterisk in this example), one of which includes the account number field. Here, the user does not know an account number for this new customer (and perhaps does not know how to get an account number assigned for the customer), and accordingly receives an error message in the form of a pop-up window 161 generated by the CRM app when she tries to submit the form without the account number field filled in (see FIG. 9). The error message informs the user that she is required to complete all of the form fields marked with "*" before submitting a new record to the CRM database.

The embedded browser 133 may not only measure the time the user is spending on the form 160 without a correct submission, but also that the data set the user has attempted to submit includes an empty account number field, by monitoring the UI device(s) associated with the client device 131. This, in turn, allows the analytics server 132 to determine when user performance or navigation problems are occurring, and how to recommend appropriation solutions to those problems based upon machine learning from historical input from other users that overcame the given problem. In the present example, the form 160 also includes a checkbox 162 with an associated label "incomplete". Unbeknownst to the current user, this option allows a record to be submitted to the CRM database in an incomplete format without all of the required fields. However, because the label provided by the app developer next to the checkbox 162 is somewhat cryptic and not intuitive, it does not occur to the present user (and likely other users as well) that this option may be used to help her overcome the current problem of not having an account number.

Yet, by tracking successful submissions of the form 160 by other users in which the account number field is empty and the checkbox 162 is checked, as well as unsuccessful submissions where the account number is empty and the checkbox is not checked, through machine learning the analytics server 132 is able to provide instructions to the current user to help her navigate through this problem. More particularly, in the present example this takes the form of another pop-up window 163 that is generated by the embedded browser 133, not the CRM app, but which is overlayed on top of the app form 160. Thus, the analytics server 132 may track the steps and time leading up to the completion of the form 160, and compare these to other users to identify the optimal or best time and appropriate steps to complete a task.

Rather than merely identifying the problem to the user as the pop-up window 161 does, the pop-up window 163 instead provides a solution to the user from the analytics server 132 that if she does not know the information for one of the required fields, she can select the check box 162 to temporarily save the record and fill in the missing information later. Moreover, the instructions provided by the other helpful indicators may take other forms besides text pop-up windows. Here, the embedded browser 133 is also prompted to display an arrow 164 pointing the user to the check box 162. It should be noted that the pop-up window 163 and arrow 164 are but a few examples of instructional indicators that may be used, and that others may be used in different embodiments. These may be provided on the display of the client device 131 by the embedded browser 133 in the same way watermarks and other indicators are currently displayed over top of an app running therein, as discussed above. For example, with users that are systematically identified as lost/frustrated, a pop-up window 163 may be provided with a recommended next step, or a choice of steps, such as: "If you want to do task A, click here, or to do task B, click here," after which the embedded browser 133 generates the appropriate commands to initiate or complete the desired action.

Referring additionally to FIG. 11, in some embodiments the analytics server 132 may be configured to generate a report 170 identifying user navigation problem across one or more of the Web applications 134 accessed by the client devices 131. In the illustrated example, the report 170 includes two problems identified with the form 160 described above. These two problems include the above-described account number submission error (users attempting to submit the form 160 without providing an account number in the account number field) which has occurred 337 times in the applicable period of measurement (here the past 30 days), as well as a similar problem with the "position" field which has occurred 128 times during the same period of measurement. Various styles of reports and variables (e.g., reporting periods, number of apps for which problems are reported, URL from which the problem originated, etc.) may be used in different embodiments. The issues reported may relate to various situations including app navigation experience or performance such as latency as measured by app response time from an action like a keyboard or mouse click, for example.

Figure 12:
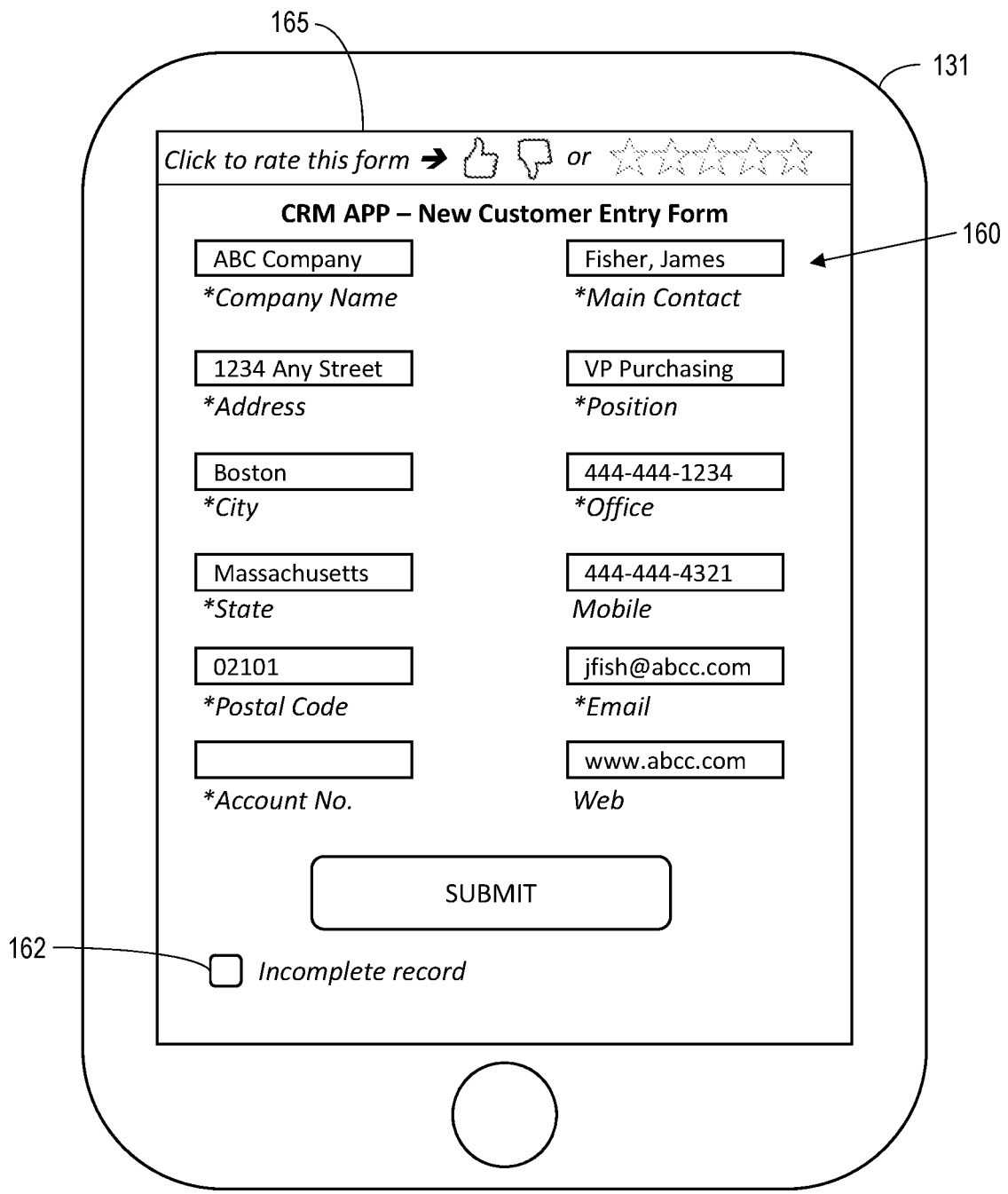
FIG. 12 is a client device display view illustrating an approach for providing an on-screen menu for user feedback in the system of FIG. 6.

In the example described above with respect to FIGS. 8-10, the input monitored by the analytics server 132 may be considered indirect input in the sense that it came from the user of the client device (through one or more UI devices), but it was not specifically provided by the user to identify that she was having a problem with the form 160. Rather, this data was indirectly collected from the user's input in trying to complete and submit the form 160. On the other hand, in the example implementation shown in FIG. 12, a user feedback bar 165 is provided by the embedded browser 133 which allows the user to directly provide input to the analytics server 132 indicating that there is a problem with the form 160. This type of feedback may also be included on the report 170 for IT or other personnel to use for reviewing where user navigation or performance problem areas exist.

In the illustrated example, the feedback bar 165 includes selectable thumbs up and thumbs down icons, as well as five selectable stars, either of which may be chosen by the user to indicate the performance or navigational quality of the form 160 from her point of view. In some embodiments, a more detailed drop down dialog box with contextual selections and open text field may be used. Other suitable direct feedback selection tools may also be used in different embodiments.

In some embodiments, the source of the data may be anonymous if desired. The collected data may be aggregated with other users' actions and feedback to identify common problems with user experience (UX), navigation or performance. In addition to direct user feedback, other indicators of problem navigation such as frequent page forward and back without completing an action, entering search terms multiple times, or closing an app without completing a task may also be compiled. Generally speaking, when a relatively large number of users (e.g., more than a threshold) are experiencing the same issue, then it implies that there is an underlying problem or architecture weaknesses in the given app.

Yet, rather than having to wait for user feedback, and then contact the app provider when problems are identified, IT and/or virtualization service providers may instead more readily identify these problem areas through the embedded browser 133 and quickly create the appropriate instructional indicators (pop-up windows, arrows, etc.) to facilitate the given task that the server 132 determines the user is trying to accomplish. That is, IT administrators or virtualization service providers can utilize the results to provide guidance and instructions to improve the experience without the ISV or app developer involvement/dependency, and having to wait for updates to actually be implemented in the app code.

As such, the present approach does not depend on the ISV or app developer to collect data to provide the feedback and insight. The embedded browser 133 is the collection point for both user provided input as well as navigation analytics. This data is may advantageously be coupled with network performance data to provide a comprehensive view of one or more Web/SaaS apps (or other apps) as it relates to usability and performance, along with the ability to provide contextual popup guidance for users.

Figure 13:
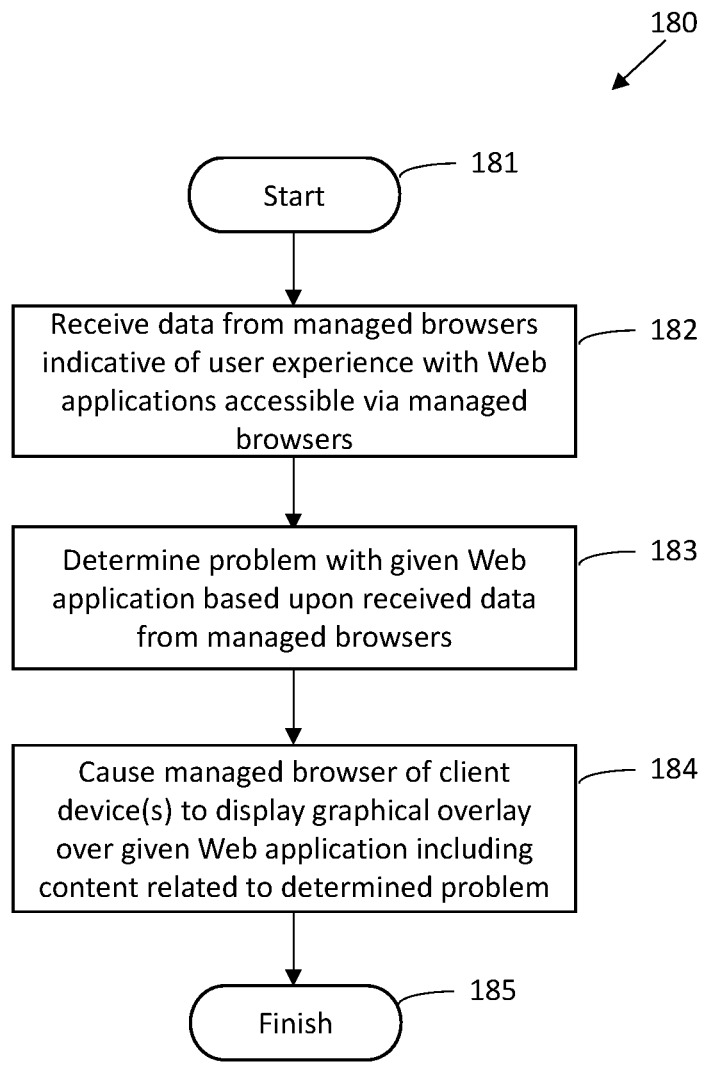
FIG. 13 is a flow diagram illustrating example method aspects associated with the system of FIG. 4.

Turning to the flow diagram 180 of FIG. 13, a related method is now described. Beginning at Block 181, the method illustratively includes communicating with a plurality of client devices 131 configured to remotely access Web applications via managed browsers (e.g., the embedded browser 133) and receiving data from the managed browsers, at Block 182. As noted above, the data is indicative of user experience with the Web applications accessible via the managed browsers. The method further illustratively includes determining a problem with a given Web application based upon the received data from the managed browsers, at Block 183, and causing the managed browser of at least one of the client devices 131 to display a graphical overlay (e.g., the pop-up windows 161, 163 and/or arrow 164, etc.) over the given Web application including content related to the determined problem, at Block 184. The method of FIG. 13 illustratively concludes at Block 185.

As will be appreciated by one of skill in the art upon reading the foregoing disclosure, various aspects described herein may be embodied as a device, a method or a computer program product (e.g., a non-transitory computer-readable medium having computer executable instruction for performing the noted operations or steps). Accordingly, those aspects may take the form of an entirely hardware embodiment, an entirely software embodiment, or an embodiment combining software and hardware aspects.

Furthermore, such aspects may take the form of a computer program product stored by one or more computer-readable storage media having computer-readable program code, or instructions, embodied in or on the storage media. Any suitable computer readable storage media may be utilized, including hard disks, CD-ROMs, optical storage devices, magnetic storage devices, and/or any combination thereof.

Many modifications and other embodiments will come to the mind of one skilled in the art having the benefit of the teachings presented in the foregoing descriptions and the associated drawings. Therefore, it is understood that the foregoing is not to be limited to the example embodiments, and that modifications and other embodiments are intended to be included within the scope of the appended claims.

That which is claimed is:

1. A computing device comprising:
a memory and a processor cooperating with the memory to:
communicate with a plurality of client devices running instances of a Web application;
track successful and unsuccessful submissions by users of the instances of the Web application;
record the successful and unsuccessful submissions for use by a machine learning algorithm that is executed by the computing device;
determine that a user is having a problem with a submission to an instance of the Web application based upon received data from the client devices;
determine, by the machine learning algorithm, instructions the user can follow to solve the problem; and
cause at least one of the plurality of client devices to display a graphical overlay over an instance of the Web application, the graphical overlay including the instructions the user can follow to solve the problem.

2. The computing device of claim 1 wherein the Web application comprises a Software as a Service (SaaS) application.

3. The computing device of claim 1 wherein at least some of the client devices access the Web application through managed browsers installed on the client devices, and the processor receives the data from the managed browsers.

4. The computing device of claim 1 wherein the processor is further configured to host browser sessions through which at least some of the client devices access the Web application and receive the data from the hosted browser sessions.

5. The computing device of claim 1 wherein the data comprises user navigation data, and wherein the problem comprises a user navigation problem.

6. The computing device of claim 1 wherein the processor determines the problem based upon a latency of the Web application.

7. The computing device of claim 1 wherein the processor determines the problem based upon a timing to complete a form within the Web application.

8. A method comprising:
at a computing device;
communicating with a plurality of client devices running instances of a Web application;
tracking successful and unsuccessful submissions by users of the instances of the Web application;
recording the successful and unsuccessful submissions for use by a machine learning algorithm that is executed by the computing device;
determining that a user is having a problem with a submission to an instance of the Web application based upon received data from the client devices;
determining, by the machine learning algorithm, instructions the user can follow to solve the problem; and
causing at least one of the plurality of client devices to display a graphical overlay over an instance of the Web application, the graphical overlay including the instructions the user can follow to solve the problem.

9. The method of claim 8 wherein the Web application comprises a Software as a Service (SaaS) application.

10. The method of claim 8 wherein at least some of the client devices access the Web application through managed browsers installed on the client devices, and wherein receiving comprises receiving the data from the managed browsers.

11. The method of claim 8 further comprising, at the computing device, hosting browser sessions through which at least some of the client devices access the Web application; and
wherein receiving comprises receiving the data from the browser sessions.

12. The method of claim 8 wherein the data comprises user navigation data, and wherein the problem comprises a user navigation problem.

13. The method of claim 8 wherein determining comprises determining the problem based upon a latency of the web application.

14. A non-transitory computer-readable medium having computer-executable instructions for causing a computing device to perform steps comprising:
communicating with a plurality of client devices running instances of a Web application;
tracking successful and unsuccessful submissions by users of the instances of the Web application;
recording the successful and unsuccessful submissions for use by a machine learning algorithm that is executed by the computing device;
determining that a user is having a problem with a submission to an instance of the Web application based upon received data from the client devices;
determining, by the machine learning algorithm, instructions the user can follow to solve the problem; and
causing at least one of the plurality of client devices to display a graphical overlay over an instance of the Web application, the graphical overlay including the instructions the user can follow to solve the problem.

15. The non-transitory computer-readable medium of claim 14 wherein the Web application comprises a Software as a Service (SaaS) application.

16. The non-transitory computer-readable medium of claim 14 wherein at least some of the client devices access the web application through managed browsers installed on the client devices, and wherein receiving comprises receiving the data from the managed browsers.

17. The non-transitory computer-readable medium of claim 14 further having executable instructions for causing the computing device to host browser sessions through which at least some of the client devices access the Web application; and wherein receiving comprises receiving the data from the browser sessions.

18. The non-transitory computer-readable medium of claim 14 wherein the data comprises user navigation data, and wherein the problem comprises a user navigation problem.

19. The non-transitory computer-readable medium of claim 14 wherein determining comprises determining the problem based upon a latency of the Web application.

* * * * *